United States Patent
Damour

(10) Patent No.: US 12,497,716 B2
(45) Date of Patent: Dec. 16, 2025

(54) COMPOSITE YARN, MANUFACTURING PROCESS AND TEXTILE SURFACE COMPRISING SUCH A YARN

(71) Applicant: Mermet, Les Avenieres-Veyrins-Thuellin (FR)

(72) Inventor: Francois-Xavier Damour, Lyons (FR)

(73) Assignee: Mermet, Les Avenieres-Veyrins-Thuellin (FR)

( * ) Notice: Subject to any disclaimer, the term of this patent is extended or adjusted under 35 U.S.C. 154(b) by 0 days.

(21) Appl. No.: 18/800,490

(22) Filed: Aug. 12, 2024

(65) Prior Publication Data

US 2024/0401248 A1 Dec. 5, 2024

Related U.S. Application Data

(63) Continuation of application No. 17/981,096, filed on Nov. 4, 2022, now Pat. No. 12,091,782, which is a continuation of application No. 17/048,600, filed as application No. PCT/EP2019/060238 on Apr. 19, 2019, now Pat. No. 11,530,497.

(30) Foreign Application Priority Data

Apr. 20, 2018 (FR) ........................................ 1853527
Sep. 21, 2018 (FR) ........................................ 1858616

(51) Int. Cl.
| | | |
|---|---|---|
| D02G 3/40 | (2006.01) | |
| C03C 25/28 | (2018.01) | |
| C03C 25/42 | (2006.01) | |
| C03C 25/47 | (2018.01) | |
| D02G 3/36 | (2006.01) | |
| D02G 3/44 | (2006.01) | |
| D03D 15/267 | (2021.01) | |
| D03D 15/47 | (2021.01) | |

(52) U.S. Cl.
CPC ............ *D02G 3/404* (2013.01); *C03C 25/28* (2013.01); *C03C 25/42* (2013.01); *C03C 25/47* (2018.01); *D02G 3/36* (2013.01); *D02G 3/443* (2013.01); *D03D 15/267* (2021.01); *D03D 15/47* (2021.01); *D10B 2503/03* (2013.01)

(58) Field of Classification Search
CPC .......... D02G 3/36; D02G 3/404; D02G 3/443; D03D 15/267; D03D 15/47; C03C 25/28; C03C 25/42; C03C 25/47
See application file for complete search history.

(56) References Cited

U.S. PATENT DOCUMENTS

| | | |
|---|---|---|
| 4,713,139 A | 12/1987 | Ganga |
| 5,275,883 A | 1/1994 | Leone |
| 6,032,454 A | 3/2000 | Damour |
| 9,045,845 B2 | 6/2015 | Conesa |
| 10,870,768 B2 | 12/2020 | Brick |
| 2003/0054717 A1 | 3/2003 | Ahluwalia |
| 2005/0042447 A1 | 2/2005 | Conesa |
| 2006/0047052 A1 | 3/2006 | Barrera |
| 2007/0048523 A1 | 3/2007 | Pollet |
| 2010/0003879 A1 | 1/2010 | Conesa |
| 2010/0089017 A1 | 4/2010 | Conesa |
| 2011/0117353 A1 | 5/2011 | Henshaw |
| 2013/0171416 A1 | 7/2013 | Diekmann |
| 2013/0317150 A1 | 11/2013 | Wan |
| 2015/0307393 A1 | 10/2015 | Guillot |
| 2016/0115351 A1 | 4/2016 | Iezzi |
| 2016/0137849 A1 | 5/2016 | Leroux |
| 2017/0030012 A1* | 2/2017 | Bathelier ............... B32B 5/024 |
| 2017/0044694 A1 | 2/2017 | Damour, Jr. |

FOREIGN PATENT DOCUMENTS

| | | |
|---|---|---|
| CN | 102862295 | 1/2013 |
| EP | 0900294 | 3/1999 |
| EP | 1605094 | 12/2005 |
| EP | 2789732 | 10/2014 |
| FR | 2548084 | 1/1985 |
| FR | 2566324 | 12/1985 |
| FR | 2648957 | 12/1990 |
| JP | S63268765 | 11/1988 |
| JP | 2006524737 | 11/2006 |
| JP | 2009275303 | 11/2009 |
| WO | 0109226 | 2/2001 |
| WO | 03056082 | 7/2003 |

(Continued)

OTHER PUBLICATIONS

International Search Report received in PCT/EP2019/060238, mailed May 23, 2019.

(Continued)

*Primary Examiner* — Shaun R Hurley

(74) *Attorney, Agent, or Firm* — Suzannah K. Sundby, Esq.; Canady + Lortz LLP

(57) ABSTRACT

A composite yarn comprising a continuous multifilament core yarn incorporated in a matrix, is characterized in that the matrix comprises at least one polymer material and at least one reinforcing filler, the reinforcing filler being formed from functionalized particles, said particles having a median size ($d_{v50}$) of less than 40 μm. A process for manufacturing such a composite yarn, comprises at least one step of depositing, by coating or extrusion, a matrix comprising a polymer and a reinforcing filler, onto a core yarn. A textile surface comprises at least one such composite yarn.

20 Claims, No Drawings

(56) References Cited

FOREIGN PATENT DOCUMENTS

| | | |
|---|---|---|
| WO | 2010001240 | 1/2010 |
| WO | 2011033130 | 3/2011 |
| WO | 2014083162 | 6/2014 |
| WO | 2014207397 | 12/2014 |

OTHER PUBLICATIONS

Written Opinion received in PCT/EP2019/060238, mailed May 23, 2019.
Glass Beads Speed Up Processing, Mar. 1, 2003, pp. 18, vol. 47, No. 3, Publisher: Reinforced Plastics.

\* cited by examiner

COMPOSITE YARN, MANUFACTURING PROCESS AND TEXTILE SURFACE COMPRISING SUCH A YARN

CROSS-REFERENCE TO RELATED APPLICATION DATA

This application is a continuation of U.S. application Ser. No. 17/981,096, which is a continuation of U.S. application Ser. No. 17/048,600, which is a 371 national phase entry of PCT/EP2019/060238 filed Apr. 19, 2019, which claims priority to FR 1853527 filed Apr. 20, 2018, and FR 1858616 filed Sep. 21, 2018, all of which are herein incorporated by reference in their entirety.

BACKGROUND OF THE INVENTION

The present invention, which is disclosed below, relates to the general field of composite yarns, generally obtained by coating a continuous multifilament yarn with a matrix comprising at least one polymer; of textiles made from these yarns, and to sunblinds, or other sun-blocking, sun-screening or sun-shielding, made from such textiles or yarns.

Composite yarns are technical yarns that are well known and commonly used, which generally comprise:
- a core including a continuous multifilament yarn (i.e. a yarn formed from several filaments) which is generally twisted;
- a matrix, containing at least one polymer material, for example a chlorinated polymer material such as polyvinyl chloride (PVC), a plasticizer, and usually a flame-retardant system composed of one or more mineral fire-retardant fillers; and
- a sheath or envelope.

Mineral fire-retardant fillers are insoluble mineral solid substances and are usually intended to be dispersed by a mechanical means in an organic matrix. Fire-retardant fillers are used for improving the fire resistance of a material. Fire-retardant fillers are typically chosen from halogenated, organophosphorous (phosphonate, phosphinate, phosphate, etc.), boron-based or nitrogenous molecules, metal hydroxides of the $(M(OH)_n)$ type, in which M is a metal, for instance aluminum or magnesium, or antimony oxides such as antimony trioxide or pentoxide. Many applications require flame-retardant materials (i.e., materials with fire-resistance properties). To this end, at least one fire-retardant filler may be incorporated into the material. It is also necessary to adapt the formulation thus obtained to the application conditions. To do this, other materials may be present in the matrix, such as a viscosity reducer, which makes it possible to adjust the viscosity of the chemical preparation intended for the manufacture of the matrix of the composite yarn.

A composite yarn is generally obtained by depositing a polymer on the continuous multifilament yarn or "core yarn" (also known as the "fiber") which usually has a torsion. Two techniques are mainly used for this purpose: the "plastisol" technique, comprising the coating of the core yarn with at least one layer of plastisol, said plastisol layer comprising the polymer, the plasticizer, and optionally other components such as fillers, followed by gelation of the plastisol around the core yarn; and the "extrusion-coating" technique, comprising the heating of the polymer from the solid form to the liquid form in an extruder followed by deposition on the core yarn and then calibration with a die. The term "plastisol" designates a product obtained from a dispersion of a polymer in a plasticizer generally in the form of an oil. This dispersion is heated, which means that the plasticizer, starting at a certain temperature, becomes a solvent of the polymer. There is thus a change from a two-phase medium to a one-phase medium. This transformation, which is a sort of gelation, is irreversible. The "extrusion-coating" technique is reserved exclusively for extrudable thermoplastic polymers.

In general, the center of the composite yarn is formed from a zone in which all the filaments are concentrated. This zone is usually very poor in polymer. Therefore, the filaments are generally in direct contact with each other. The lack of separation between the filaments, and the absence of cohesion due to the lack of polymer, lead to pulling during operations for cutting of the textiles made with these composite yarns: if the sheath is cut, the filaments are no longer maintained in place, and can easily be pulled. This poses a problem over time since the pulled filaments create zones of fragility, which can diminish the mechanical properties of the composite yarns. This is particularly true in the case of composite yarns made with textile glass yarns, since the latter are very water-sensitive and, via a capillarity effect, the water which can infiltrate into the composite yarn can after a certain time strongly degrade the mechanical properties.

To overcome this problem, various technical solutions have been implemented, including the solution described in patent application WO 03/056082. Said document describes a composite yarn obtained by coating on each filament. It is thus possible to produce a flame-retardant composite yarn by depositing a flame-retardant coating on the composite yarn obtained on conclusion of a first coating free of filler. However, individual coating of the filaments stiffens the composite yarn, which makes it difficult to manipulate the textile obtained from this composite yarn, and may go as far as to render it unsuitable for use as a fabric for blinds according to the prescriptions of standard EN 13561 by giving it a "memory" after rolling up, which will greatly affect its appearance after a few cycles of use. Standard EN 13561 concerns external blinds, and includes requirements for performance, including in relation to safety.

Patent application WO 2011/033130 itself describes an improvement of patent application WO 03/056082, in that the process for manufacturing the composite yarn comprises a preliminary step of mechanical opening; preferably splaying of the individual filaments of which the core yarn is composed (so as to allow the accessibility of the matrix to each of the filaments). However, the process described in WO 2011/033130 is very complicated to implement. Furthermore, the core yarn must be able to withstand a substantial mechanical stress generated by the mechanical opening of the individual filaments of which it is composed. This limits the choice of the core yarn.

Textiles obtained from composite yarns, generally by weaving, and intended for making blind fabrics, are subject to fire performance regulations in various jurisdictions.

In Germany, there is a class under standard DIN 4102-1, composed of three categories which define the reaction to fire of materials (code B1 to B3). Code B1 denotes the most stringent classification for an organic material. It is generally required for solar protection textiles especially in Germanophile regions and, by influence, in Northern Europe.

In France, there is a class under standard NF P92-507, composed of five categories (or classes) which define the fire reaction of materials (code M0 to M4). This classification is based, for unmeltable materials such as fabrics based on inorganic fibers, on the duration of persistence of flames after the removal of a burner, on the destroyed length of specimens, and also on the possible dripping of enflamed drops during the performance of the test under the standard NF P92-503. Standard NF P92-507 describes a class which utilizes tests carried out under standard NF P92-503. For meltable materials, additional tests are required according to the standards NF P92-504 and NF P92-505. Combustibility is the heat emitted by total combustion of the material, whereas the flammability is the amount of flammable gas produced by the material. Code M1 denotes non-flammable combustible materials, and applies especially to solar protection textiles intended for the French market and also, by influence, to the markets of Southern Europe.

At the present time, the French and German classifications, although still widely used, are in the process of being supplanted by the European standard EN 13-501-1 which defines "euroclasses".

Euroclasses define fire performance. They are used, inter alia, to characterize products for construction and for the fitting of buildings. They are more complete than each of the French and German classes taken individually, since they take into account the fire performance of the material denoted A1, A2, B, C, D or F according to the level of energy released, the opacity of the fumes released (amount and speed) denoted "s" for "smoke" (code s1 to s3) and also any projected enflamed droplets and debris denoted "d" for "droplets" (code d0 to d2). The common commercial composite yarns obtained by coating a mineral core yarn such as textile glass yarn (or glass fiber) with a plastisol, which is even highly flame-retardant, make it possible to prepare textiles which at best meet the fire performance criteria of euroclass Cs3d0 of the standard EN 13-501-1. Ideally, they should meet the fire performance criteria of euroclass Bs2d0 of the standard EN 13-501-1. However, at the present time, no commercial composite yarn obtained by coating a flame retardant PVC plastisol on a mineral core yarn such as glass textile yarn makes it possible to prepare solar protection textiles which meet the fire performance criteria of euroclass Bs2d0 or Bs3d0 of the standard EN 13-501-1.

To prepare flame-retardant composite yarns, use is usually made of fire-retardant fillers dispersed in the polymer of the matrix. These fire-retardant fillers are of very diverse size and form.

Patent EP 0900294 describes a composite yarn such that the polymer material which constitutes its matrix is chlorinated, and comprising a fire-retardant filler of ternary composition combining an oxygenated antimony compound (in general antimony trioxide), a hydrated metal oxide and a zinc borate, the total composition of inorganic material of the composite yarn being between 4 and 65%. The plasticizer generally comprises at least one organic phthalate and is free of phosphate. However, certain phthalates are reputed to be toxic and antimony salts are suspected of having toxicity.

Patent application WO 2010/001240 describes an improvement of patent EP 0900294, in that the flame-retardant plastisol comprises a lead-free chlorinated polymer, in that the plasticizer is free of orthophthalate and in that the fire-retardant filler is free of antimony and comprises metal hydrate and a zinc salt. However, the content of flame-retardant agent is high, whereas the content of plasticizer is relatively low to comply with the fire classes, which leads to stiffness of the composite yarn and thus to difficulties for obtaining, from such a composite yarn, blind fabrics that are also in accordance with the performance requirements prescribed by standard EN 13561.

DETAILED DESCRIPTION OF THE INVENTION

There is thus a need for composite yarns which have improved fire performance relative to the prior art, which are simple to manufacture and which allow the production of blind fabrics which meet the requirements of standard EN 13561. One aspect of the present disclosure is to present improvements in the fire performance of composite yarns. Another aspect of the present disclosure is to provide a process for manufacturing composite yarns that is simple to perform. Another aspect of the present disclosure is to allow the use of glass textile yarn, as core yarn, with low torsion and containing a standard sizing for the purpose, among other things, of reducing the composite yarn manufacturing costs. Another aspect of the present disclosure is to provide a process which complies with the environmental standards and which, in particular, uses components that are not suspected of being toxic and which limits the emission of volatile organic compounds (VOCs).

Thus, according to a first aspect, a composite yarn comprising a continuous multifilament core yarn incorporated in a matrix, is characterized in that the matrix comprises at least one polymer material and at least one reinforcing filler, the reinforcing filler being made of functionalized particles, said particles having a median size ($d_{v50}$) of less than 40 µm.

Advantageously, the composite yarn has a titer (or count) which is less than the titer of the composite yarns of the prior art. Thus, typically, the composite yarn, when the core yarn has a titer of 68 tex, has a titer of 135-140 tex whereas the composite yarns of the prior art have a titer of about 165 tex for the same core yarn. This advantageously makes it possible to reduce the mass per unit area and the thickness of textiles made from composite yarns by, respectively, about 10 to 20%, and about 10 to 15%.

The continuous multifilament core yarn has preferably a torsion within the range of from 20 to 40 rounds per meter.

According to a preferred embodiment, the torsion of the core yarn is between 28 and 40 turns per meter.

According to an even more preferred embodiment, the torsion of the core yarn is 28 turns per meter.

Preferably, the functionalized particles of the reinforcing filler (or reinforcing particles) are dispersed throughout the matrix of the composite yarn, the matrix being in contact with the core yarn filaments.

Particularly preferably, some of the reinforcing filler is present in the inter-filament interstices of the core yarn. Advantageously, the smallest particles of the reinforcing filler are present in the inter-filament spaces interstices of the core yarn.

In any case the matrix forms generally a continuous medium in which the functionalized particles are dispersed.

Preferably, the dispersion of the functionalized particles in the matrix is homogeneous. By "homogeneous", it should be understood that the concentration in functionalized particles in the matrix is of the same order of magnitude at any point of said matrix.

According to a preferred embodiment disclosed herein, the composite yarn is made of the core yarn, the matrix, and a sheath.

The term "between X and Y", X and Y being any numerical values, means between X and Y, limits excluded. The term "within the range from Z to T", Z and T being any numerical values, means between Z and T, limits included.

The term "A and/or B", A and B being any characteristics, means "A" or "B" or "A and B".

The term "tex" means, as is usual for a person of ordinary skill in the art, the mass in grams of one kilometer of yarn.

The term "matrix" means an element comprising at least one polymer material in contact with the core yarn.

Preferably, the particles have a hardness (Mohs) less than or equal to the hardness of the material constituting the core yarn.

Mohs hardness is a measurement of the hardness of minerals. Mohs scale is based on ten readily available minerals. The hardness scale ranges from 1 (for talc) to 10 (for diamond). It is measurable by comparison (capacity of one to scratch the other) of a mineral with two other minerals whose hardness is already known. In general, this value is given by the product suppliers. Thus, the hardness of textile glass yarn formed from multifilaments is 5.5. Textile glass yarn is commonly called silionne. Textile glass yarn is a twisted assembly of various filaments of sized silionne. The term "sized" will be explained herein below. According to a preferred embodiment, the Mohs hardness of the particles constituting the reinforcing filler is at least 1 and not more than 5.5, including for example increments of 0.5 between these values. In other words, this hardness is in the range from 1 to 5.5.

If the hardness of the reinforcing particles is less than 1, the reinforcing filler is generally friable and therefore it becomes destructured because it cannot withstand the shear during the manufacturing steps of the composite yarn. If the hardness of the reinforcing particles is greater than 5.5, the reinforcing filler may locally damage the filaments constituting the core yarn.

The term "size" (or "average size") means, as is usual, the diameter which would be had by the theoretical sphere behaving in the same manner as a particle under consideration during the chosen particle size analysis operation. The term "diameter" or "equivalent diameter" is also used.

In the technical field under consideration, the measurements are generally taken by screening with a succession of vibrating screens or by laser particle size analysis (using a diffraction laser). The particle size is preferably measured by laser particle size analysis. A machine that may be used for laser particle size measurement is typically a Malvern Instruments brand machine, for example a Malvern Masterizer 2000 Instrument machine. This machine makes it possible, inter alia, to determine the volume distribution of the particles, and in particular the dimensions $d_{v50}$, $d_{v10}$ and $d_{v90}$ explained hereinbelow. It is usual to combine, as is known to those of ordinary skill in the art, the use of a powder drier, for example of Scirocco 2000 type, which makes it possible to dry the dry powder which feeds the laser particle size analyzer.

The median size ($d_{v50}$), or size ($d_{V50}$) gives the median size: 50% (by volume) of the particles have a smaller size, and 50% (by volume) of the particles have a larger size. The particles have a median size ($d_{v50}$) of less than 40 µm, and preferably less than 30 µm, and generally greater than 5 µm, and preferably greater than 15 µm. Preferably, the median size ($d_{v50}$) is between 5 µm and 40 µm, and still more preferably between 15 µm and 30 µm, or within the range from 15 µm to 30 µm, including for example increments of 1 µm therebetween. If the median size of the reinforcing particles ($d_{v50}$) is less than 5 µm, too large an amount of particles of the reinforcing filler is present in the inter-filament interstices of the core yarn. In process terms, this generally results in the surface area of these particles being too great and leads to an increase in the viscosity of the polymer material constituting the matrix when it is deposited. If the median size ($d_{v50}$) of these reinforcing particles is greater than 40 µm, too few of these reinforcing particles are present in the inter-filament interstices of the core yarn. In process terms, this generally results in the dispersion of the particles of the reinforcing filler in the inter-filament interstices of the core yarn being difficult and therefore insufficient. The breaking strength of the composite yarn is then generally judged insufficient.

The size ($d_{v10}$) gives the size below which 10% (by volume) of the particles have a smaller size, and 90% (by volume) of the particles have a larger size. The particles generally have a size ($d_{v10}$) of less than 15 µm, and preferably within the range from 1 µm to 15 µm.

If the size ($d_{v10}$) of the reinforcing particles is less than 1 µm, too large an amount of particles of the reinforcing filler is present in the inter-filament interstices of the core yarn. In process terms, this generally results in the surface area of these particles being too great and leads to an increase in the viscosity of the polymer material constituting the matrix when it is deposited. If the size ($d_{v10}$) of the reinforcing particles is greater than 15 µm, too few of these reinforcing particles are present in the inter-filament interstices of the core yarn. In process terms, this generally results in the dispersion of the particles of the reinforcing filler in the inter-filament interstices of the core yarn being difficult and therefore insufficient. The breaking strength of the composite yarn is then generally judged insufficient. The size ($d_{v90}$) gives the size below which 90% (by volume) of the particles have a smaller size, and 10% (by volume) of the particles have a larger size. The particles generally have a size ($d_{v90}$) of less than 90 µm, preferably within the range from 30 µm to 90 µm, and still more preferably from 30 µm to 80 µm.

If the size ($d_{v90}$) of the reinforcing particles is less than 30 µm, too large an amount of particles of the reinforcing filler is present within the inter-filament spaces of the core yarn. In process terms, this generally results in the surface area of these particles being too great and leads to an increase in the viscosity of the polymer material constituting the matrix when it is deposited. If the size ($d_{v10}$) of the reinforcing particles is greater than 90 µm, too few of these reinforcing particles are present in the inter-filament interstices of the core yarn. In process terms, this generally results in the dispersion of the particles of the reinforcing filler in the inter-filament interstices of the core yarn being difficult and therefore insufficient. The breaking strength of the composite yarn is then generally judged insufficient. In the textile field using the composite yarn, the nominal value of the average diameter of each of the filaments of the core yarn is generally within the range from 3.5 µm to 13 µm, typically in the range from 3.5 µm to 9 µm, still more preferably in the range from 6 µm to 9 µm, for example 6 µm or 9 µm. This nominal value is generally given by the core yarn supplier. Other nominal values may be envisaged for other uses of the composite yarn.

According to a preferred embodiment, the ratio between the median size ($d_{v50}$) of the reinforcing particles and the diameter of each of the filaments of the core yarn is generally in the range from 0.15:1 to 12:1, preferably from 1.5:1 to 5:1.

According to a preferred embodiment, the weight percentage of reinforcing filler present in the composite yarn is within the range of 0.5 to 30%. According to a more preferred embodiment, the weight percentage of reinforcing filler present in the composite yarn is within the range of 0.5 to 20%. According to an even more preferred embodiment, the weight percentage of reinforcing filler in the composite yarn is within the range of 1 to 10%.

According to a preferred embodiment, the reinforcing filler is chosen from the group formed by functionalized fillers, preferably from the group formed by functionalized glass beads, functionalized calcium carbonate, and functionalized talc.

The functionalized glass beads have a hardness of 5.5. The functionalized calcium carbonate has a hardness of 3.0. The functionalized talc has a hardness of 1.0.

The term "functionalized" means "surface-treated", i.e., a functionality has been added to the surface of the particle via at least one organic group. This functionalization is performed with at least one compound, known as a functionalizing agent. The functionalization makes it possible to create a "chemical bridge" between the filler and its environment, which in this case is the matrix. It is thus possible to chemically link (for example via covalent bonds) or physicochemically link (for example via hydrogen bonds) the filler, the core yarn, and the matrix. Advantageously, this makes it possible to obtain a substantially homogeneous medium in which all the constituents are bound together via chemical bonds of organic type. Advantageously, this gives the material substantial cohesion and homogeneity of the mechanical properties. This is coherent with the use of the term "reinforcing filler". In other words, the reinforcing filler is fully attached to the polymer constituting the matrix and also to the core yarn.

Moreover, the reinforcing filler has a particle size that is small enough for some of them to be present in the inter-filament interstices of the core yarn, which advantageously allow fillings of the inter-filament interstices, preferably of all of the inter-filament interstices.

As regards talc, which is composed of phyllosilicate particles, the functionalizing agent is generally chosen from the group formed by oxysilanes (or siloxanes) and oxygermanes bearing at least one organic group. This is described, for example, in WO 2014/207397.

The functionalized glass beads are generally made by chemical grafting, covalently and directly or indirectly, of a reagent onto the surface of the glass. This is described, for example, in WO 2014/083162. Functionalized glass beads are marketed by the company Sovitec under the name Microperl® or Omicron®. Calcium carbonate is generally functionalized by chemical grafting of reagents onto the surface. The processes performed are similar to those used for glass beads.

Preferably, the reinforcing filler is functionalized with at least one compound chosen from silanized agents such as silanes, for example alkyl alkoxy silanes; epoxies, among which mention may be made of epoxysilanes and DGEBA (Bisphenol A diglycidyl ether); and polyisocyanates such as MDI derivatives (or 4,4'-MDI for 4,4'-diphenylmethane diisocyanate) or HDI (for hexamethylene diisocyanate).

Preferably, the reinforcing filler is functionalized with at least one compound chosen from silanized agents, epoxies, and polyisocyanates, and even more preferably silanized agents.

Silanized agents are compounds comprising at least one silyl group, such as alkyl alkoxysilanes, alkylsilyl halides, for example such as trimethylsilyl chloride or diemethylsilyl dichloride, tetramethylsilane, tetraethoxysilane, dimethylsiloxane, 1,1,1,3,3,3-hexamethyldisilazane, etc.

By "silyl", is meant a radical derived from silane.

By "alkyl", is meant a radical derived from alkane, comprising from 1 to 20 carbon atoms, preferably from 1 to 10 carbon atoms, and more preferably from 1 to 5, carbon atoms.

By "alcoxysilane", is meant a compound comprising a divalent group —Si—O and an alkyl group comprising from 1 to 20, preferably from 1 to 10, and more preferably from 1 to 5, carbon atoms.

Silanes are preferentially used, since there is a wide range of these products. Silane is the molecule of formula $SiH_4$. By extension, the term "silane" here and as is usual refers to any compound whose central atom is silicon such as $SiHCl_3$ (trichlorosilane) or tetramethylsilane $Si(CH_3)_4$ or tetraethoxysilane $Si(OC_2H_5)_4$. The functionalized reinforcing filler is referred to as a silanate if it is functionalized with a silane, that is, a covalent bond is created between at least one silyl group of the silane and a particle of the reinforcing filler. For example, silanization by means of trimethylsilyl chloride creates trimethylsilyl groups covalently bonded to the particles, or silanization by means of dimethylsilyl dichloride creates dimethylsilyl groups covalently bonded to the particles. A person of ordinary skill in the art can readily identify a grade that is perfectly suited to the situation, as a function of the filler, of the core yarn and of the matrix. Epoxies and polyisocyanates are preferred most particularly in the case where the core yarns are of organic origin (polyesters, polyamides, polyvinyl alcohol, etc.).

According to a preferred embodiment, the matrix further comprises at least one fire-retardant filler.

Fire-retardant fillers are well known to those of ordinary skill in the art. They are generally chosen from oxygenated antimony compounds, for example antimony trioxide, certain zinc salts, including zinc hydroxystannate or zinc borate, hydrated metal oxides, the metal of which is chosen from the group formed by aluminum, magnesium, tin and zinc, for example an alumina hydrate such as alumina trihydrate or a magnesium hydrate such as magnesium hydroxide, and phosphorus-based ceramics which act as intumescent systems.

The constituent material of the core yarn is preferably chosen from silionne, basalt, aramids, polyesters, polyamides, carbon, and polyvinyl alcohol. In a particularly preferred manner, the constituent material of the core yarn is silionne. As indicated above, silionne has a Mohs hardness of 5.5.

In the case where the constituent material of the core yarn is silionne, it is known that the core yarn may be formed from a "standard" textile glass yarn or from a "specific" glass yarn.

Standard textile glass yarn has a torsion generally within the range from 20 to 40 turns per meter. The torsion is typically 28 turns per meter for a core yarn tex of 33 tex or 68 tex, or 40 turns per meter for a core yarn of 22 tex. Standard textile glass yarn further comprises a sizing generally based on starch, the purpose of which is to protect the silionne filaments and to ensure their cohesion. This is then referred to as a sized textile glass yarn. The compositions of such sizing are in general developed by the companies which commercialize these core yarns, which do not disclose them.

The sizing is deposited on the individual filaments composing the textile glass yarn during what is called in this industry the "forming" operation which consists in spinning the filaments of molten glass through the holes of a die at high speed. This sizing is generally deposited on the surface of the filaments in the form of an aqueous emulsion during the manufacture of the core yarn. It generally represents from 0.5% to 1.5% of the weight composition of the core yarn. For textile yarns, the role of the sizing is to protect the filaments to allow their manipulation and to reduce the phenomenon of static electricity during weaving. The textile sizing is usually composed of an adhesive agent (which is generally starch), and possibly at least one wetting agent (intended to improve the impregnation of the yarn) and/or at least one lubricant. In contrast with the specific textile glass yarn, the standard textile glass yarn does not include any coupling agent in its sizing.

Thus, the standard textile glass yarn is generally a textile glass yarn having a torsion in the range from 20 to 40 turns per meter, and comprising a sizing comprising, preferably being formed from, at least one adhesive agent, and possibly at least one wetting agent and/or at least one lubricant.

The specific textile glass yarn, usually used in the applications for coating textile glass yarn with a PVC plastisol, has a torsion generally in the range from 40 to 80 turns per meter and/or what is referred to as specific sizing, which, in addition to the sizing of the standard textile glass yarn, contains at least one adhesion promoter and/or at least one coupling agent for the sizing. The torsion value is generally linked to the final application concerned. The adhesion promoter and/or the coupling agent is/are intended to allow adhesion (mainly by creating at least one chemical bond) between the constituent filaments of the textile glass yarn and the adhesion promoter(s) and/or coupling agent(s) and, furthermore, between the adhesion promoter(s) and/or coupling agent(s) and the polymer(s) constituting the matrix. The constituent filaments of the textile glass yarn and the polymer(s) are thus chemically bonded. Preferably, the specific sizing further comprises at least one organic binder and/or at least one lubricant. The adhesion promoters/coupling agents are generally silanes. Each textile glass yarn manufacturer has his own sizings, the exact chemical compositions of which are known only to him. There are thus sizings that are specially developed for promoting silionne/PVC adhesion such as the sizings TD52 and TD53 from the company VETROTEX and sizings specially developed for promoting adhesion of silionne with various types of polymers such as the sizings TD22 and TD37 from the company VETROTEX.

Thus, the specific textile glass yarn is generally a textile glass yarn with a torsion in the range from 40 to 80 turns per meter, and/or comprising a sizing comprising, preferably formed from, at least one adhesive agent, and at least one adhesion promoter and/or at least one coupling agent.

The specific textile glass yarn is thus much more expensive than the standard textile glass yarn.

In a particularly advantageous manner, the composite yarn may comprise a core yarn which is a standard textile glass yarn, rather than mandatorily a specific textile glass yarn.

Without wishing to be limited by any theory, the Applicant thinks that this advantage is obtained by means of a certain amount of control of the bonding between the polymer constituting the matrix and the core yarn, and by virtue of the presence in the matrix of the functionalized particles which play an intermediate role and which behave like "articulations" between the constituent filaments of the textile glass yarn and the constituent polymer of the matrix. These functionalized particles create chemical bonds between the standard sizing of the core yarn and the polymer constituting the matrix, which is not possible according to the prior art.

In the case of textile applications, this thus advantageously makes it possible to replace the specific textile glass yarn with a standard textile glass yarn, which allows an appreciable reduction in the cost of manufacture of the composite yarn, of the order of 25%, and which opens the panel of potential suppliers of core yarns for the composite yarn manufacturer, especially towards those which have the largest worldwide production capacities, for example the Asiatic suppliers manufacturing textile glass yarns intended for producing printed circuit boards. Specifically, not only is the raw material of the core yarn less expensive, in particular by avoiding the use of special and expensive organic products for the sizing (namely at least one adhesion promoter and/or at least one coupling agent), but also it is possible, by means of less twisting of the core yarns which are textile glass yarns, to limit the time of passage of these yarns on the twisting machines generally used in textile production.

As will be shown in the examples, the qualities of the composite yarn obtained by using a core yarn which is a standard textile glass yarn are not compromised, or are even superior to those of the composite yarns of the prior art using a core yarn which is a specific textile glass yarn. Without wishing to be limited by any theory, the Applicant thinks that it is by virtue of easier access to the inter-filament interstices, permitted by the functionalized particles present in the matrix.

The core yarn of the composite yarn may thus be a standard textile glass yarn. The core yarn of the composite yarn may also be a specific textile glass yarn. The softening point or melting point of the constituent material of the core yarn must be higher than the temperature of implementation of the polymer material of the matrix of the composite yarn. For example, the softening point of the constituent material of the core yarn when it is a textile glass yarn is at least 20° C. higher, preferably at least 30° C. higher and even more preferably at least 50° C. higher than the temperature of implementation of the polymer material of the matrix of the composite yarn. By way of example, the temperature of implementation of the polymer material of the matrix of the composite yarn is typically in a range from 50 to 180° C. The softening point of the constituent material of the core yarn, when said yarn is a textile glass yarn, is typically about 600° C.

According to a preferred embodiment, the composite yarn further comprises at least one layer, also termed "sheath" or "envelope" enveloping said matrix, the layer comprising at least one polymer material and at least one reinforcing filler. This layer is usually deposited in the same manner as the matrix, preferably by coating. According to a preferred embodiment, the composite yarn is formed from the core yarn, the matrix and the sheath.

Preferably, the polymer material of this layer is of the same chemical nature as the polymer material of the matrix. The term "same chemical nature" means of compatible chemical composition, as is known to those of ordinary skill in the art. According to a preferred embodiment, the reinforcing filler of said layer is of the same chemical nature as the reinforcing filler of said matrix. Advantageously, this identity of chemical nature makes it possible to obtain a composite yarn which has better homogeneity, i.e., the core yarn, the matrix, and the layer of which it is composed interact in terms of sorption and adhesion.

In addition, at least one other additive may be incorporated and distributed in the matrix, in the layer or both (layer and matrix), such as one or more fire-retardant fillers, a pigmentary filler and/or a heat stabilizer and/or a UV stabilizer.

Preferably, the sheath further comprises at least one fire-retardant filler. Such a fire-retardant filler is chosen from the fire-retardant fillers known to those of ordinary skill in the art and described above.

The disclosure advantageously makes it possible to limit the amount (by weight) of fire-retardant filler present in the composite yarn Thus, usually, the amount (by weight) of fire-retardant filler in the composite yarn is generally more than 1.5% and less than 7.5%, e.g., about 3% by weight relative to the total weight of the composite yarn, to obtain a level of flame retardancy similar to that of the composite yarns of the state of the art, for which the amount by weight of flame retardant filler is most often from 8 to 12% by weight relative to the total weight of the composite yarn.

The disclosure advantageously makes it possible to obtain a composite yarn which, for an identical amount (by weight) of fire-retardant filler, has fire resistance performance that is particularly improved relative to that of the composite yarns of the prior art. Thus, it is permitted, for the first time, to manufacture a composite yarn whose core yarn is formed from silionne, which meets the criteria Bs2d0 or Bs3d0 of Euroclasse standard EN 13501-1. Without wishing to be bound by any theory, the Applicant thinks that the inorganic nature of the reinforcing filler allows local dispersion of the heat supplied by the fire. In addition, filling of the inter-filament interstices with the reinforcing particles makes it possible to eliminate a "chimney" effect associated with the existence of a lack of material at the center of the core yarn, which favors flame propagation. According to one embodiment, the composite yarn comprises a continuous multifilament core yarn and a matrix, the matrix comprising:
  (i) at least one polymer material, the polymer being chosen from the group consisting of PVCs, polyacrylates, polyolefins, polyesters, polyvinyls, polystyrenes, polyurethanes, EVA polymers and polyamides, and
  (ii) at least one reinforcing filler, the reinforcing filler being constituted by particles dispersed in the polymer material of the matrix and present in the inter-filament interstices of the core yarn, said particles being functionalized and having a median size ($d_{v50}$) less than 40 µm,
the composite yarn further comprising a flame-retardant filler in an amount of approximately 0.5 to 5% by weight and being such that the textile surfaces obtained from said yarn meet the performance requirements prescribed by the standard EN 13561 (more than 10 000 cycles).

By "textile surface", is meant a mechanical assembly of yarns, such as a fabric, a non-woven, a knit, a textile grid, etc. By "textile surface obtained from said yarn", is meant that the yarn assembly is the composite yarn.

According to one embodiment, the composite yarn comprises a continuous multifilament core yarn and a matrix, the matrix comprising:
  (i) at least one polymer material, the polymer being chosen from the group consisting of PVCs, polyacrylates, polyolefins, polyesters, polyvinyls, polystyrenes, polyurethanes, EVA polymers and polyamides, and
  (ii) at least one reinforcing filler, the reinforcing filler being constituted by particles dispersed in the polymer material of the matrix and present in the inter-filament interstices of the core yarn, said particles being functionalized and having a median size ($d_{v50}$) less than 40 µm,
the composite yarn further comprising a flame-retardant filler in an amount of approximately 0.5 to 5% by weight, and being such that the textile surfaces obtained from said yarn meet the fire performance requirements of class M1 of the standard NF P-92-507.

According to one embodiment, the composite yarn comprises a continuous multifilament core yarn and a matrix, the matrix comprising:
  iii) at least one polymer material, the polymer being chosen from the group consisting of PVCs, polyacrylates, polyolefins, polyesters, polyvinyls, polystyrenes, polyurethanes, EVA polymers and polyamides, and
  (iv) at least one reinforcing filler, the reinforcing filler being constituted by particles dispersed in the polymer material of the matrix and present in the inter-filament interstices of the core yarn, said particles being functionalized and having a median size ($d_{v50}$) less than 40 µm,
the composite yarn further comprising a flame-retardant filler in an amount of approximately 5 to 15% by weight, and being such that the textile surfaces obtained from said yarn meet the fire performance requirements of Euroclass Bs2d0 or Bs3d0 of the standard NF P13501-1.

According to a second aspect, the present disclosure also covers a process for manufacturing a composite yarn according to the first aspect, said process comprising at least one step of depositing, by coating or extrusion, a matrix comprising at least one polymer material and at least one reinforcing filler, onto a core yarn.

The matrix incorporates, in addition to the polymer material, at least one reinforcing filler and possibly at least one other additive such as a flame-retardant filler.

The polymer used for the deposition is a conventional polymer such as a PVC, a polyacrylate, a polyolefin, a polyester, a polyvinyl, a polystyrene, a polyurethane, an ethylene-vinyl acetate (or EVA) polymer or a polyamide. PVCs and polyacrylates are generally used by the deposition by coating, typically with plastisol technology. Polyolefins, polyesters, polyvinyls, polystyrenes, polyurethanes, EVA polymers and polyamides are generally used by extrusion deposition.

Preferably, the reinforcing filler is dispersed throughout the polymer before deposition. In other words, the reinforcing filler is mixed with the polymer, in particular when the latter is heated for the deposition if the polymer is deposited in liquid form. It may be mixed as a mixture of powders when the polymer is in powder form. It may also be intimately mixed with the polymer by an extrusion operation ("compounding") when the polymer is in the form of granules.

Such deposition is carried out particularly preferably such that a proportion of the filler is disposed in the inter-filament interstices of the core yarn. This is generally carried out by adjusting the rheological characteristics of the matrix during deposition, as is known to the person of ordinary skill in the art.

Preferably, the depositing step is performed by coating with a plastisol on the filaments of the core yarn, the plastisol more preferably being based on polyvinyl chloride (PVC) or alternatively based on acrylic resin (polyacrylate). By "based on" is meant according to the invention "mainly comprising".

Plastisols are well known to the person of ordinary skill in the art. They are generally pastes at room temperature obtained by dispersing a powdery synthetic resin (which is the polymer) in a liquid plasticizer. Various plastisols are described, for example, in patent application WO 2010/001240.

According to a preferred embodiment, the manufacturing process further comprises at least one step of coating, onto the composite yarn manufactured at the depositing step, at least one layer of polymer material in which is dispersed at least one reinforcing filler. In this case, preferably, the layer further comprises at least one fire-retardant filler.

This coating step is typically performed by coating with a plastisol onto the composite yarn obtained at the depositing step or by extrusion of a compound onto the composite yarn obtained at the depositing step, preferably by coating with a plastisol onto the composite yarn obtained at the depositing step.

The layer incorporates at least one reinforcing filler, and possibly at least one other additive such as a fire-retardant filler.

The polymer used for the coating is generally similar to the polymer used for the deposition. The polymer used for the coating is generally chosen from the group consisting of PVCs, polyacrylates, polyolefins, polyesters, polyvinyls, polystyrenes, polyurethanes, EVA polymers and polyamides.

The parameters of this coating step are generally similar to the parameters of the depositing step explained above, including addition by mixing one or more additives into the polymer before the coating.

Coating with a plastisol on the composite yarn obtained at the depositing step has been explained above.

The term "compound" means a compound (which is generally granular) of a plasticized polymer (PVC, polyacrylate, etc.), or a compound (which is generally granular) of a polymer (polyolefin, polyester, polyvinyl, polystyrene, polyurethane, EVA, polyamide, etc.) of low glass transition temperature, said compound also optionally comprising at least one additive such as a stabilizer and/or a fire-retardant filler. The term "compound" is well known to those of ordinary skill in the art. The term "plasticized polymer" means, as it is understood to those of ordinary skill in the art, that there is intimate mixing between the polymer and a plasticizer which has been used to plasticize it.

Preferably, in the case where the coating step is performed by extrusion of a compound, the coating step is performed by extrusion-coating of a composite yarn obtained in the depositing step with a compound in which is dispersed at least one reinforcing filler. The reinforcing filler has been described above.

The disclosure also relates, in a third aspect, to a textile surface comprising at least one composite yarn according to the first aspect or manufactured according to the second aspect.

Preferably, said textile surface is prepared by weaving.

The present disclosure will be understood more clearly in the light of the example that follows, which illustrates a selected embodiment of the claimed invention without, however, limiting the scope thereof.

EXAMPLES

Example 1

Two composite yarns according to one embodiment were manufactured, from PVC plastisol, by coating a non-flame-retardant matrix comprising silanized glass microbeads as reinforcing filler, followed by coating with a flame-retardant layer itself also containing silanized glass microbeads as reinforcing filler on a core yarn. The core yarn was composed of a textile glass yarn from two different sources. The silanized glass beads had a hardness of 5.5 Mohs. They were spherical and had an average diameter of 20 µm, with a $d_{v50}$ of 30 µm, a $d_{v10}$ of 15 µm and a $d_{v90}$ of 80 µm, as measured for example by laser particle size measurement using a Malvern Masterizer 2000 Instrument machine.

A control composite yarn was also made on the basis of the teaching of patent EP 0900294, with two successive coatings of the same PVC plastisol on the same core yarn.

1. Composite Yarns According to One Embodiment of the Invention

Core Yarns: Textile Glass Yarns

The textile glass yarns are characterized by the chemical composition of the silionne, their titer expressed in tex, the diameter and the number of filaments of which the yarn is composed, their torsion and the type of sizing used:

Since the sizing is the protective coating deposited immediately after spinning the silionne, the final use of the textile glass yarn conditions the chemical nature of the sizing.

Two types of core yarn were used, respectively, for the two composite yarns according to the embodiment:

A specific textile glass yarn specially developed for the "PVC coating" application (and thus more expensive) bearing a specific sizing compatible with PVC coating (silane based sizing TD52M sold by the company Vetrotex, of unknown proprietary composition) and also a high torsion (52 turns per meter, i.e. "1.3Z"); it was also used for the control composite yarn;

a standard textile glass yarn (torsion 28 turns per meter, i.e. "0.7Z") covered with a starch-based sizing.

PVC Plastisols According to one Embodiment

In each case, the core yarn was coated using a first non-flame-retardant coating containing silanized glass microbeads and then a second sparingly flame-retardant coating also containing silanized glass microbeads. The compositions of the two plastisols used are given in Tables 1 and 2 below.

Plastisol 1 (Matrix)

TABLE 1

| Component function | Component | Plastisol composition in PHR (per hundred resin) | % weight composition |
| --- | --- | --- | --- |
| Plasticizer | Benzoate/dioctyl terephthalate | 56.5 | 31.4% |
| Heat stabilizer | Liquid stabilizer of Ba/Zn type | 5.9 | 3.3% |
| Inorganic filler | Silanized glass beads (Microperl ® 050-20 from the company Sovitec) | 17.6 | 9.8% |
| PVC resin | PB1302 from the company Kem-one (emulsion polymerized PVC resin of K-Wert* 67) | 100.0 | 55.6% |
| Total | | 180.0 | 100.0% |

*Fikentscher constant, representing the molecular mass of the polymer

The RV-type Brookfield viscosity of this plastisol was: 1200 mPa·s (measured with a No. 3 spindle at 23° C.).

The temperature of the yarn exiting the coating line was: 125° C.

Plastisol 2 (Layer)

TABLE 2

| Component function | Component | Plastisol composition in PHR (per hundred resin) | % weight composition |
|---|---|---|---|
| Plasticizer | Benzoate/dioctyl terephthalate | 45.0 | 23.1% |
| Heat stabilizer | Liquid stabilizer of Ba/Zn type | 5.0 | 2.6% |
| PVC resin 1 | EXT from the company Vinnolit (suspension polymerized PVC resin of K-Wert 66) | 20.0 | 10.3% |
| Flame-retardant 1 | Zinc hydroxystannate (Flamtard H from the company William Blythe) | 10.0 | 5.1% |
| Flame-retardant 2 | Ceramic (Adrafoc CR-B from the company Adrafoc) | 5.0 | 2.6% |
| Flame-retardant 3 | Alumina trihydrate (Sh 30 from the company Alteo) | 5.0 | 2.6% |
| Opacifier | Sachtolit L zinc sulfide from the company Sachleben | 10.0 | 5.1% |
| Inorganic filler | Silanized glass beads (Microperl ® 050-20 from the company Sovitec) | 15.0 | 7.7% |
| PVC resin 2 | PB1302 from the company Kem-one (emulsion PVC resin of K-Wert 67) | 80.0 | 41.0% |
| Total | | 195.0 | 100.0% |

The RV-type Brookfield viscosity of this plastisol was: 1350 mPa·s (measured with a No. 3 spindle at 23° C.).

The temperature of the yarn at the outlet of the coating line was: 135° C.

Plastisols 1 and 2 contain no viscosity reducer. This absence of viscosity reducer is one advantage, which is very beneficial for the conservation of the plastisol and participates in reducing the emission of VOCs during the production of the composite yarn.

Two composite yarns were thus obtained according to one embodiment, the characteristics of which are given in Table 3 below.

TABLE 3

| Type of base yarn | ECG 75 0.7Z | ECG 75 1.3Z |
|---|---|---|
| Torsion | Z28 | Z52 |
| Sizing | Starch standard (B12) | Specific (TD52M) |
| Titer of the yarn after the 1st coating | 108 tex | 110 tex |
| Titer of the yarn after the 2nd coating | 135 tex | 140 tex |
| Breaking strength of the coated yarn (measured using a tensile testing machine with jaws specific for the yarn, at a tensile speed of 50 mm/min) | 50N | 54N |

2. Control Yarn

A control yarn, of reference 165 tex, was made according to the recommendations of patent EP 0900294, starting with the core yarn which is a specific textile glass yarn, specially developed for the PVC coating of specific sizing type TD52M sold by the company Vetrotex and of high torsion (52 turns per meter) similar to that used for one of the two composite yarns according to the embodiment. Only two successive coatings were performed with the same plastisol. The composition of the plastisol used is given in Table 4 below.

TABLE 4

| Component function | Component | Plastisol composition in PHR (per hundred resin) | % weight % composition |
|---|---|---|---|
| Plasticizer | Diisodecyl phthalate (DIDP) | 45.43 | 24.2% |
| Heat stabilizer | Liquid stabilizer of Ba/Zn type | 4.96 | 2.6% |
| PVC resin | EXT from the company Vinnolit | 20 | 10.6% |
| Flame-retardant 1 | Antimony trioxide (Triox from the company PLC) | 7.65 | 4.1% |
| Flame-retardant 2 | Zinc borate | 7.64 | 4.1% |
| Flame-retardant 3 | Alumina hydrate | 7.65 | 4.1% |
| Opacifier | Zinc sulfide (ZnS) in a plasticizer of DIDP terephthalate type in a 70/30 ratio (weight/weight) | 3.10 | 1.7% |
| PVC resin | PB1302 from the company Kem-one | 80 | 42.7% |
| Lubricant | Wacker ® AK 50 silicone oil from the company Wacker Chemie | 0.93 | 0.5% |
| Diluent (viscosity reducer) | $C_{11}$-$C_{13}$ isoparaffinic fraction Isopar ® L from the company Exxon | 10.08 | 5.4% |
| Total | | 187.44 | 100.0% |

The RV-type Brookfield viscosity of this plastisol was: 1300 mPa·s (measured with a No. 3 spindle at 23° C.). This value was obtained with the addition of 5.4% of a volatile viscosity reducer, the presence of which generated VOCs during the transformation of the plastisol.

The temperature of the yarn at the outlet of the coating line was: 135° C.

3. Results

The three composite yarns and the corresponding textiles obtained by the same operation for the weaving of these composite yarns had the characteristics given, respectively, in Tables 5 and 6 below.

TABLE 5

|  | Composite yarn A according to the embodiment | Composite yarn B according to the embodiment | Control composite yarn C |
|---|---|---|---|
| Titer of the core yarn | 68 tex | 68 tex | 68 tex |
| Diameter of each of the filaments | 9 μm | 9 μm | 9 μm |
| Reference of the core yarn | ECG 75 0.7Z | ECG 75 1.3Z | ECG 75 1.3Z |
| Torsion of the core yarn | Z28 | Z52 | Z52 |
| Sizing of the core yarn | Starch standard (B12 from the company NAG) | Specific (TD52M from the company Vetrotex) | Specific (TD52M from the company Vetrotex) |
| Titer of the composite yarn after the $1^{st}$ coating | 108 tex | 110 tex | — |
| Titer of the composite yarn after the $2^{nd}$ coating | 135 tex | 140 tex | 166 tex |
| Breaking strength of the final composite yarn (measured with a, as one example of the type of machine that can be used for this assessment, at a tensile speed of 50 mm/min), | 50N | 54N | 42N |

TABLE 6

|  | Composite yarn A according to the embodiment | Composite yarn B according to the embodiment | Control composite yarn C |
|---|---|---|---|
| Textile | 18 × 14 weave | 18 × 14 weave | 18 × 14 weave |
| Weight of the textile per m² in g | 450 | 450 | 520 |
| Thickness in mm of the textile | 0.67 | 0.67 | 0.75 |
| Opening factor of the textile in % (measured with a spectrophotometer at 650 nm) | 5.5% | 5.5% | 5.0% |
| Fire test class according to standard NF P-92507 | M1 | M1 | M1 |
| Visual evaluation of the smoke during combustion | Weak | Weak | Strong |
| UV stability according to standard ISO 105B02 | 7/8 | 7/8 | 7/8 |
| Mechanical strength tests according to EN 13561 | Class 3 (>10 000 cycles) | Class 3 (>10 000 cycles) | Class 3 (>10 000 cycles) |

As seen in Tables 5 and 6, the properties of yarns A and B were revealed to be greater than those of the control yarn, irrespective of the core yarn (standard for yarn A or specific for yarn B). Tables 7 and 8 below reveal the differences in composition between the control yarn C and yarn B according to one embodiment made with the same core yarn. These results also apply to yarn A, which uses the same plastisols as yarn B and which is made with a textile glass yarn having an identical titer to that of the textile glass yarn used for making yarns B and C.

TABLE 7

| Component | Composite yarn according to the embodiment | Control composite yarn |
|---|---|---|
| Core yarn made of textile glass yarn | 50.4% | 42.3% |
| Plasticizer | 14.0% | 14.8% |
| Flame retardant(s) | 1.9% | 7.5% |
| Inorganic reinforcing filler | 4.5% | — |
| PVC | 26.8% | 32.5% |
| Opacifier (zinc sulfide) | 1.0% | 1.0% |
| Various additives | 1.5% | 1.9% |
| TOTAL (weight %) | 100% | 100% |

It was thus seen that yarn B according to one embodiment includes an amount of fire-retardant filler equal to about 25% (i.e., the ratio of 1.9% to 7.5%) by weight of the amount of fire-retardant filler of the control yarn C, for the same fire resistance class. Thus, the amount of fire-retardant filler was able to be reduced by about 75% to obtain a level of flame retardancy similar to that of the control composite yarn.

This leads to a significant drop in production costs. Thus, for the composite yarn according to the embodiment comprising a textile glass yarn as core yarn and a PVC plastisol, this results in a significant reduction in the costs of the PVC plastisol, of the order of 25% to 35%, to obtain a fire compliance result identical to that obtained according to the prior art, for example the class M1 according to the present example.

TABLE 8

| Weight ratio of components | Composite yarn B | Control composite yarn C |
|---|---|---|
| % sheath (matrix + layer) | 50.5% | 58.8% |
| Plasticizer/core yarns | 14.3% | 14.7% |
| Plasticizer/PVC | 52.4% | 45.4% |
| Flame retardant/organic materials | 4.5% | 15.2% |
| Mineral materials/organic materials | 17.3% | 17.2% |
| Flame retardant/plasticizer | 13.5% | 50.5% |

It was thus seen that yarn B according to the embodiment has a similar mineral materials/organic materials ratio (58.8% for the control yarn C; 50.5% maximum for yarn B), whereas the flame retardant/organic materials ratio is greatly reduced (15.2% for yarn C; 4.5% for yarn B). However, yarn B makes it possible to obtain the same level of fire performance.

In addition, the use of a reinforcing filler makes it possible to obtain higher mechanical properties (increase in the breaking strength of the yarn by 18.5%: 54 N for yarn B and 42 N for yarn C; see Table 5), whereas the overall level of plasticization of the two yarns is similar (14.7% for yarn C; 14.3% for yarn B; see Table 8), which ensures equivalent flexibility for the 2 yarns.

In sum, a composite yarn is disclosed wherein the use of particles in a matrix enables the material, by virtue of the particles that are incorporated therein, to be present in the inter-filament interstices of the core yarn. The particles interact both with the core yarn filaments and with the matrix polymer to provide one or more of the benefits described above, based on the disclosed parameters and the desired application.

Example 2

1. Composite Yarns

One composite yarn according to one embodiment (D) was manufactured, from PVC plastisol, by two successive coatings of the same PVC plastisol coating containing flame-retardant particles and silanized glass microbeads as reinforcing filler on a core yarn. The core yarn is the standard textile glass yarn composed with a low torsion (28 rounds per meter) of Example 1 and a title of 68 tex. Two types of silanized glass beads were used. The silanized glass beads Microperl® had a hardness of 5.5 Mohs. They were spherical and had an average diameter of 20 µm, with a $d_{v50}$ of 30 µm, a $d_{v10}$ of 15 µm and a $d_{v90}$ of 80 µm, as measured for example by laser particle size measurement using a Malvern Masterizer 2000 Instrument machine. The silanized glass beads Omicron® had a hardness of 5.5 Mohs. They were spherical and had an average diameter of 5 µm, with a $d_{v50}$ of 7 µm, a $d_{v10}$ of 2 µm and a $d_{v90}$ of 15 µm, as measured for example by laser particle size measurement using a Malvern Masterizer 2000 Instrument machine.

One control composite yarn (E) was also used, which is a commercial product of the Applicant, made by two successive coatings of the same PVC plastisol on a core yarn. The core yarn is the specific textile glass yarn with a high torsion (52 rounds per meter) of Example 1 and a title of 68 tex. This commercial product has the best fire performance among the commercial products sold by the Applicant, thus meeting both the fire performance criteria "M1" of standard NF 92-503 and the fire performance criteria "B1" of standard DIN 4102-1.

The compositions of the plastisol used are given in Tables 9 and 10 below.

TABLE 9

| | Composite yarn according to the embodiment D | | | |
|---|---|---|---|---|
| Component function | Component | Sheath composition in PHR (per hundred (PVC) resin) | sheath composition in wt % of the sheath | sheath composition in wt % of the composite yarn |
| Plasticizer 1 | Benzoate dioctyl terephtalate | 37.0 | 20.2% | 10.% |
| Plasticizer 2 | PLF 290 from the company Thor | 5.0 | 2.7% | 1.4% |
| Heat stabilizer | Liquid stabilizer of Ba/Zn type | 3.0 | 1.6% | 0.8% |
| Flame-retardant 1 | Zinc hydroxystannate | 5.0 | 2.7% | 1.4% |
| Flame-retardant 2 | Alumina hydrate | 10.0 | 5.5% | 2.8% |
| Flame-retardant 3 | Phosphorous ceramic powders | 5.0 | 2.7% | 1.4% |
| Inorganic filler 1 | Silanized glass beads (Microperl ® 050-20 from the company Sovitec) | 12.8 | 7.0% | 3.6% |
| Inorganic filler 2 | Silanized glass beads (Omicron ® 110-P8 from the company Sovitec) | 3.2 | 1.7% | 0.9% |
| Opacifier | Zinc sulfide (ZnS) in a plasticizer of DIDP terephthalate type in a 70/30 ratio (weight/weight) | 1.1 | 0.6% | 0.3% |
| PVC resin | PB1302 from the company Kem-one | 68 | 37.2% | 19.0% |
| PVC resin | EXT from the company Vinnolit | 32 | 17.5% | 8.9% |
| Fumed silica | Wacker ® AK 50 silicone oil from the company Wacker Chemie | 0.8 | 0.4% | 0.2% |
| Total I | | 182.7 | 100.0% | 50.7% |

The RV-type Brookfield viscosity of this plastisol was: 900 mPa·s (measured with a No. 3 spindle at 23° C.). The temperature of the yarn at the outlet of the coating line was: 155° C.

The title of the composite yarn D according to the embodiment thus obtained was 139 tex.

TABLE 10

| | | Control composite yarn E | | |
|---|---|---|---|---|
| Component function | Component | Sheath composition in PHR (per hundred (PVC) resin) | sheath composition in wt % of the sheath | Sheat composition in wt % of the composite yarn |
| Plasticizer | Diisodecyl phthalate (DIDP) | 45.5 | 25.9% | 15.2% |
| Heat stabilizer | Liquid stabilizer of Ba/Zn type | 5.0 | 2.8% | 1.7% |
| Flame-retardant | Base on antimonytrioxide and zinc hydrostannate | 23.0 | 13.0% | 7.8% |
| Opacifier | Zinc sulfide (ZnS) in a plasticizer (terephthalate type) in a 70/30 ratio (weight/weight) | 1.1 | 0.6% | 0.4% |
| PVC resin | PB1302 from the company Kem-one | 80 | 45.6% | 26.8% |
| PVC resin | EXT from the company Vinnolit | 20 | 11.4% | 6.7% |
| Lubricant | Wacker ® AK 50 silicone oil from the company Wacker Chemie | 0.9 | 0.5% | 0.3% |
| Total | | 175.5 | 100% | 58.8% |

The RV-type Brookfield viscosity of this plastisol was: 1300 mPa·s (measured with a No. 3 spindle at 23° C.). The temperature of the yarn at the outlet of the coating line was: 135° C.

The title of the control composite yarn E thus obtained was 165 tex.

2. Results

The two composite yarns and the corresponding textiles obtained by the same operation for the weaving of these composite yarns had the characteristics given, respectively in Tables 11, 12 and 13 below.

TABLE 11

| | Control composite yarn E | Composite yarn D according to the embodiment |
|---|---|---|
| Textile | 18 × 10 weave | 21 × 11 weave |
| Weight of the textile per m² in g | 462 | 455 |
| Thickness in mm of the textile | 0.57 | 0.59 |
| Opening factor of the textile in % (measured with a spectrophotometer at 650 nm) | 1.2% | 1.3% |
| Titer of the composite yarn in tex | 165 | 139 |
| Breaking strength of the final composite yarn (measured with | 38N | 42N |

TABLE 11-continued

| | Control composite yarn E | Composite yarn D according to the embodiment |
|---|---|---|
| a, as one example of the type of machine that can be used for this assessment, at a tensile speed of 50 mm/min), | | |

Composite yarn D according to the embodiment gave textile surfaces having substantially similar weight, thickness and opening factors to that of the textile surface obtained by control composite yarn E, the mechanical properties of the two composite yarns are quite similar.

TABLE 12

| | Control composite yarn E | Composite yarn D according to the embodiment |
|---|---|---|
| % sheath (matrix + layer) | 59% | 51% |
| % flame retardant/composite yarn | 7.8% | 5.6% |
| % plasticizer/PVC | 45.5% | 42% |
| % plasticizer/composite yarn | 15.2% | 11.4% |

TABLE 12-continued

| | Control composite yarn E | Composite yarn D according to the embodiment |
|---|---|---|
| % flame retardant/organic materials | 15.4% | 14.0% |
| % mineral materials/organic materials on sheath | 15.9% | 26.1% |
| % flame retardant/plasticizer | 50.5% | 47.6% |

As seen in Tables 11 and 12, in comparison with the control yarn E, composite yarn D according to the embodiment has a slightly lower flame retardant/organic materials ratio (15.4% for control yarn E; 14% for composite yarn D), and a slightly lower flame retardant/plasticizer ratio (50.5% for control yarn E; 47.6% for composite yarn D).

TABLE 13

| | Control composite yarn E | Composite yarn D according to the embodiment |
|---|---|---|
| $FIGRA_{0.2}$ in W/s | 260 | 90 |
| $THP_{600}$ in MJ | 0.80 | 0.20 |
| Fire test class according to standard EN 13-501-1 | Cs3d0 | Bs3d0 |

The FIGRA parameter measures the speed of the energetic production during the combustion. $FIGRA_{0.2}$ parameter provides the speed level to reach 0.2 MJ. The $FIGRA_{0.2}$ value for Euroclass "B" is less or equal than 120 W/s.

The THP parameter measures the total energetic production during the combustion. The $THP_{600}$ parameter provides the energetic production level reached at 600 s. The $THP_{600}$ value for Euroclass "B" is less or equal than 7.5 MJ, whereas the $THP_{600}$ for Euroclass "C" is less or equal than 15.MJ.

The $FIGRA_{0.2}$ value obtained with the textile made from composite yarn D according to the embodiment reflects, compared to the textile made from control yarn E, a very sharp decrease in energy production during combustion (90 W/s against 260 W/s) although they have very similar physical characteristics. This level of performance ($FIGRA_{0.2}$<100 W/s) cannot normally be achieved by glass-fiber-based textiles coated with plasticized PVC.

Therefore, only composite yarn D makes it possible to meet the requirements of Euroclass "B" of standard EN 13-501-1, the control yarn meeting only the requirement of Euroclass "C" of standard EN 13-501-1. However, the textile surface obtained by composite yarn D according to the embodiment has a greatly improved fire performance although it has a lower flame retardant content than the textile surface obtained by control yarn E (5.6% against 7.8%) and a slightly lower flame retardant/plasticizer ratio (47.6% against 50.5%).

To the knowledge of the Applicant, this is the first time that a composite yarn obtained by coating a flame retardant plastisol on a glass textile yarn can meet the requirements of Euroclass "B" of standard EN 13-501-1.

ADDITIONAL EMBODIMENTS

Embodiment 1. Composite yarn comprising a continuous multifilament core yarn incorporated in a matrix, characterized in that the matrix comprises at least one polymer material and at least one reinforcing filler, the reinforcing filler being formed from functionalized particles, said particles having a median size ($d_{v50}$) of less than 40 µm.

Embodiment 2. Composite yarn according to Embodiment 1, such that the particles have a hardness (Mohs) of less than or equal to the hardness of the constituent material of the filaments of the core yarn.

Embodiment 3. Composite yarn according to one of Embodiments 1 or 2, such that the particles have a median size ($d_{v50}$) comprised between 5 µm and 40 µm.

Embodiment 4. Composite yarn according to one of Embodiments 1 to 3, such that the particles have a size ($d_{v90}$) of less than 90 µm, preferably in the range from 30 µm to 90 µm.

Embodiment 5. Composite yarn according to one of Embodiments 1 to 4, such that the particles have a size ($d_{v10}$) of less than 15 µm, preferably in the range from 1 µm to 15 µm.

Embodiment 6. Composite yarn according to one of Embodiments 1 to 5, such that the functionalized particles of the reinforcing filler are dispersed throughout the composite yarn matrix, the matrix being in contact with the core yarn filaments.

Embodiment 7. Composite yarn according to one of Embodiments 1 to 6, such that some of the reinforcing filler is present in the inter-filament interstices of the core yarn.

Embodiment 8. Composite yarn according to one of Embodiments 1 to 7, such that the reinforcing filler is chosen from the group formed by functionalized fillers, preferably from the group formed by functionalized glass beads, functionalized calcium carbonate and functionalized talc.

Embodiment 9. Composite yarn according to one of Embodiments 1 to 8, such that the reinforcing filler is functionalized with at least one compound chosen from silanized agents, epoxies, and polyisocyanates, preferably silanized agents.

Embodiment 10. Composite yarn according to one of Embodiments 1 to 9, such that the matrix further comprises at least one fire-retardant filler.

Embodiment 11. Composite yarn according to one of Embodiments 1 to 10, such that the constituent material of the core yarn is chosen from silionne, basalt, aramids, polyesters, polyamides, carbon and polyvinyl alcohol.

Embodiment 12. Composite yarn according to one of Embodiments 1 to 11, such that the constituent material of the core yarn is silionne and the core yarn is a standard textile glass yarn.

Embodiment 13. Composite yarn according to one of Embodiments 1 to 11, such that the constituent material of the core yarn is silionne and the core yarn is a specific textile glass yarn.

Embodiment 14. Composite yarn according to one of Embodiments 1 to 13, further comprising at least one sheath layer enveloping said matrix, the layer comprising at least one polymer material and at least one reinforcing filler.

Embodiment 15. Composite yarn according to Embodiment 14, such that the reinforcing filler of said layer is of the same chemical nature as the reinforcing filler of said matrix.

Embodiment 16. Composite yarn according to either of Embodiments 14 and 15, such that said layer further comprises at least one fire-retardant filler.

Embodiment 17. Process for manufacturing a composite yarn according to one of Embodiments 1 to 16, said process comprising at least one step of depositing, by coating or extrusion, a matrix comprising a polymer material and a reinforcing filler, onto a core yarn.

Embodiment 18. Process for manufacturing according to Embodiment 17, such that the reinforcing filler is dispersed throughout the polymer before depositing.

Embodiment 19. Process for manufacturing according to one of Embodiments 17 or 18, such that some of the filler is present in the inter-filament interstices of the core yarn.

Embodiment 20. Process according to one of Embodiments 17 to 19, such that the depositing step is performed by coating with a plastisol on the filaments of the core yarn, the plastisol preferably being based on polyvinyl chloride (PVC) or based on acrylic resin.

Embodiment 21. Process according to one of Embodiments 17 to 20, further comprising at least one step of coating, on the composite yarn manufactured at the depositing step by coating or extrusion, of at least one layer of polymer material in which is dispersed at least one reinforcing filler, onto the composite yarn obtained in the depositing step.

Embodiment 22. Process according to Embodiment 21, such that the coating step is performed by coating with a plastisol or by extrusion of a compound.

Embodiment 23. Process according to either of Embodiments 21 and 22, such that the layer of polymer material further comprises at least one fire-retardant filler.

Embodiment 24. Textile surface comprising at least one composite yarn according to one of Embodiments 1 to 16 or manufactured according to one of Embodiments 17 to 23.

Embodiment 25. Textile surface according to Embodiment 24, characterized in that it is made by weaving.

The invention claimed is:

1. A composite yarn, which comprises
   a core yarn comprising a plurality of filaments with interstices therebetween;
   a matrix comprising
     a polyvinyl chloride (PVC) resin, and
     at least one reinforcing filler being formed from functionalized particles having a median size ($d_{v50}$) of less than 40 μm,
     wherein (a) the mass ratio of the at least one reinforcing filler to the PVC resin is 16-17.6:100, and/or (b) the amount of the at least one reinforcing filler is 8.7-9.8 wt % of the total weight of the matrix; and
   a flame-retardant coating which comprises a flame-retardant;
   wherein the core yarn is incorporated in the matrix whereby some of the reinforcing filler is present in the interstices and the matrix forms a coating on the core yarn upon which the flame-retardant coating is layered.

2. The composite yarn according to claim 1, wherein the amount of the PVC resin in the matrix is 54.7-55.6 wt % of the total weight of the matrix.

3. The composite yarn according to claim 1, wherein the functionalized particles are silanized glass beads.

4. The composite yarn according to claim 1, wherein the flame-retardant coating comprises a polymer resin which may be the same or different from the PVC resin, and an inorganic filler which may be the same as the reinforcing filler.

5. The composite yarn according to claim 4, wherein (a) the mass ratio of the inorganic filler to the polymer resin is 15-16:100, (b) the mass ratio of the flame retardant to the polymer resin is 20:100, or both (a) and (b).

6. The composite yarn according to claim 5, wherein the amount of the flame retardant is 1.9-5.6 wt % of the total weight of the composite yarn.

7. The composite yarn according to claim 5, wherein the total amount of the reinforcing filler and the inorganic filler is 4.5 wt % of the total weight of the composite yarn.

8. The composite yarn according to claim 4, wherein (a) the amount the inorganic filler is 7.7-8.7 wt % of the weight of the flame-retardant coating, (b) the amount of the polymer resin is 51.3-54.7 wt % of the weight of the flame-retardant coating, or both (a) and (b).

9. The composite yarn according to claim 8, wherein the amount of the flame retardant is 1.9-5.6 wt % of the total weight of the composite yarn.

10. The composite yarn according to claim 8, wherein the total amount of the reinforcing filler and the inorganic filler is 4.5 wt % of the total weight of the composite yarn.

11. The composite yarn according to claim 4, wherein the total amount of the reinforcing filler and the inorganic filler is 4.5 wt % of the total weight of the composite yarn.

12. The composite yarn according to claim 1, wherein (a) the torsion of the composite yarn is 28-52 turns per meter, (b) the breaking strength of the composite yarn is 42-54N as measured using a tensile testing machine at a tensile speed of 50 mm/min, or both (a) and (b).

13. The composite yarn according to claim 1, wherein the amount of the flame retardant is 1.9-5.6 wt % of the total weight of the composite yarn.

14. A textile comprising at least one composite yarn according to claim 1.

15. A textile according to claim 14, wherein the textile is selected from sunblinds, sun-blocking textiles, sun-screening textiles, sun-shielding textiles, and combinations thereof.

16. A sun protection fabric comprising at least one composite yarn according to claim 1.

17. A blind fabric comprising at least one composite yarn according to claim 1.

18. A textile surface comprising at least one composite yarn according to claim 1.

19. The textile surface according to claim 18, wherein the at least one composite yarn is weaved together.

20. The textile surface according to claim 18, wherein the at least one composite yarn is woven into the textile surface.

* * * * *